US007701536B2

(12) United States Patent
Tsai et al.

(10) Patent No.: US 7,701,536 B2
(45) Date of Patent: Apr. 20, 2010

(54) LIQUID CRYSTAL DISPLAY PANEL AND LIQUID CRYSTAL DISPLAY DEVICE INCORPORATING THE SAME

(75) Inventors: Ching-Yu Tsai, Hsinchu (TW); Mu-Jen Su, Tainan (TW); Ching-Huan Lin, Sinying (TW); Chih-Ming Chang, Jhongli (TW)

(73) Assignee: AU Optronics Corp., Hsin-Chu (TW)

( * ) Notice: Subject to any disclaimer, the term of this patent is extended or adjusted under 35 U.S.C. 154(b) by 463 days.

(21) Appl. No.: 11/525,034

(22) Filed: Sep. 22, 2006

(65) Prior Publication Data

US 2007/0165167 A1 Jul. 19, 2007

(30) Foreign Application Priority Data

Jan. 18, 2006 (TW) ............................... 95102114 A

(51) Int. Cl.
G02F 1/1335 (2006.01)
G02F 1/1333 (2006.01)
(52) U.S. Cl. ........................................ 349/114; 349/110
(58) Field of Classification Search ................. 349/110, 349/114
See application file for complete search history.

(56) References Cited

U.S. PATENT DOCUMENTS

| 5,641,974 | A  | * | 6/1997  | den Boer et al. ............... 257/59 |
| 6,924,859 | B2 | * | 8/2005  | Ishii et al. ..................... 349/114 |
| 7,289,187 | B2 | * | 10/2007 | Choo ........................... 349/187 |
| 7,292,295 | B2 | * | 11/2007 | Wu et al. ..................... 349/113 |
| 7,379,135 | B2 | * | 5/2008  | Lin et al. ..................... 349/114 |
| 2005/0168672 | A1 |   | 8/2005  | Tashiro et al. |
| 2005/0213004 | A1 | * | 9/2005  | Sakamoto et al. ........... 349/114 |
| 2006/0055852 | A1 | * | 3/2006  | Yoshida et al. .............. 349/114 |
| 2006/0256268 | A1 | * | 11/2006 | Jeong et al. .................. 349/141 |
| 2008/0273130 | A1 | * | 11/2008 | Tung et al. .................... 349/38 |

FOREIGN PATENT DOCUMENTS

| CN | 1118077 A   | 3/1996  |
| JP | 11-295762   | 10/1999 |
| JP | 2001-343670 | 12/2001 |
| JP | 2003-315828 | 11/2003 |
| JP | 2005-338829 | 12/2005 |
| TW | M267475     | 6/2005  |

* cited by examiner

Primary Examiner—Uyen-Chau N Le
Assistant Examiner—Rhonda S Peace
(74) Attorney, Agent, or Firm—Rabin & Berdo, PC

(57) ABSTRACT

A liquid crystal display panel and a liquid crystal display device incorporating the same are provided. The liquid crystal display panel includes a first substrate, a second substrate and a liquid crystal layer. The first substrate includes a first base, a dielectric layer and a storage capacitor. The storage capacitor includes a reflective electrode. The dielectric layer covers at least part of the storage capacitor. The second substrate is substantially paralleled to the first substrate. The second substrate includes a second base, a black matrix and a common electrode. The black matrix corresponds to the storage capacitor. The black matrix includes an opening corresponding to the reflective electrode. The opening is provided to let an outside light enter into the liquid crystal display panel such that the reflective electrode reflects the outside light to provide a light source to the liquid crystal display panel.

18 Claims, 6 Drawing Sheets

LIQUID CRYSTAL DISPLAY PANEL AND LIQUID CRYSTAL DISPLAY DEVICE INCORPORATING THE SAME

This application claims the benefit of Taiwan application Serial No. 95102114, filed Jan. 18, 2006, the subject matter of which is incorporated herein by reference.

BACKGROUND OF THE INVENTION

1. Field of the Invention

The invention relates in general to a liquid crystal display panel and a liquid crystal display device incorporating the same, and more particularly to a liquid crystal display panel using an electrode of a storage capacitor as a reflective electrode and forming an opening corresponding to the storage capacitor on a black matrix and a liquid crystal display device incorporating the same.

2. Description of the Related Art

Micro-reflective liquid crystal display device is a trans-reflective liquid crystal display device capable of forming a micro-reflective element on an ordinary transmissive display panel without employing extra manufacturing process to resolve information recognition failure which is caused by strong reflection on the surface when the panel is exposed under the sunshine. However, the original TN mode manufacturing method is used without adding any extra manufacturing process. The structure of the backlight module or the polarizer is improved to achieve micro-reflection effect. However, during reflection, the reflective liquid crystal display device does not optimize the reflected voltage and reflectance (V-R) relationship curve. Moreover, since the TN mode is adopted, the contrast of the liquid crystal display device can not be improved, largely affecting the practicality of the liquid crystal display device.

SUMMARY OF THE INVENTION

It is therefore an object of the invention to provide a liquid crystal display panel and a liquid crystal display device incorporating the same. The liquid crystal display panel uses an electrode of a storage capacitor as a reflection area and has an opening on an opaque layer (such as a black matrix). The opening corresponds to the reflection area, such that the light reflected inwardly, that is, the light L1, is modulated. Besides, the liquid crystal display panel according to the present embodiment of the invention has a dielectric layer on the topmost of the storage capacitor for dividing the voltage of the liquid crystal layer in the reflection area to achieve the same saturation voltage as that in the transmissive area. Since a small part of the reflection area has both the transparent electrode and the reflective electrode, the threshold voltage of the reflection area will be close to the threshold voltage of the transmissive area, hence achieving higher reflection contrast.

The invention achieves the above-identified object by providing a liquid crystal display panel including a first substrate, a second substrate and a liquid crystal layer. The first substrate includes a first base, a storage capacitor and a dielectric layer. The storage capacitor is disposed on the first base and has a reflective electrode. The dielectric layer is disposed over the first base and covers at least part of the storage capacitor. The second substrate is substantially parallel to the first substrate and includes a second base, a black matrix and a common electrode. The black matrix is disposed on the second base and corresponds to the storage capacitor. The black matrix has an opening. The opening corresponds to the reflective electrode for letting an outside light enter the liquid crystal display panel such that the reflective electrode reflects the outside light to provide a light source to the liquid crystal display panel. The common electrode is disposed on the second base and covers the black matrix and the opening. The liquid crystal layer is disposed between the first substrate and the second substrate.

The invention further achieves the above-identified object by providing a liquid crystal display device including a liquid crystal display panel a backlight module, a first polarizer and a second polarizer. The liquid crystal display panel includes a first substrate, a second substrate and a liquid crystal layer. The first substrate includes a first base, a storage capacitor, a dielectric layer and a transparent electrode. The storage capacitor is disposed on the first base and has a reflective electrode. The dielectric layer is disposed over the first base and covers at least part of the storage capacitor. The dielectric layer has a contact hole. The transparent electrode is disposed on at least part of the dielectric layer. One end of the transparent electrode is electrically connected to the reflective electrode via the contact hole. The second substrate is substantially parallel to the first substrate and includes a second base, a black matrix and a common electrode. The black matrix is disposed on the second base and corresponds to the storage capacitor. The black matrix has an opening. The opening corresponds to the reflective electrode and the end of the transparent electrode electrically connected to the reflective electrode. Whereby outside light enters the liquid crystal display panel such that the reflective electrode reflects the outside light to provide a light source to the liquid crystal display panel. The common electrode is disposed on the second base and covers the black matrix and the opening. The liquid crystal layer is disposed between the first substrate and the second substrate. The backlight module is disposed underneath the liquid crystal display panel. The first polarizer is disposed between the backlight module and the liquid crystal display panel. The second polarizer is disposed on the liquid crystal display panel.

The invention further achieves the above-identified object by providing a liquid crystal display panel including a first substrate, a second substrate and a liquid crystal layer. The first substrate includes a first base, a storage capacitor and a dielectric layer. The storage capacitor is disposed on the first base and has a reflective electrode. The dielectric layer is disposed over the first base and covers at least part of the storage capacitor. The second substrate is substantially parallel to the first substrate and includes a second base, a color filter and a common electrode. The color filter is disposed on the second base. The common electrode is disposed on the color filter. The liquid crystal layer is disposed between the first substrate and the second substrate.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
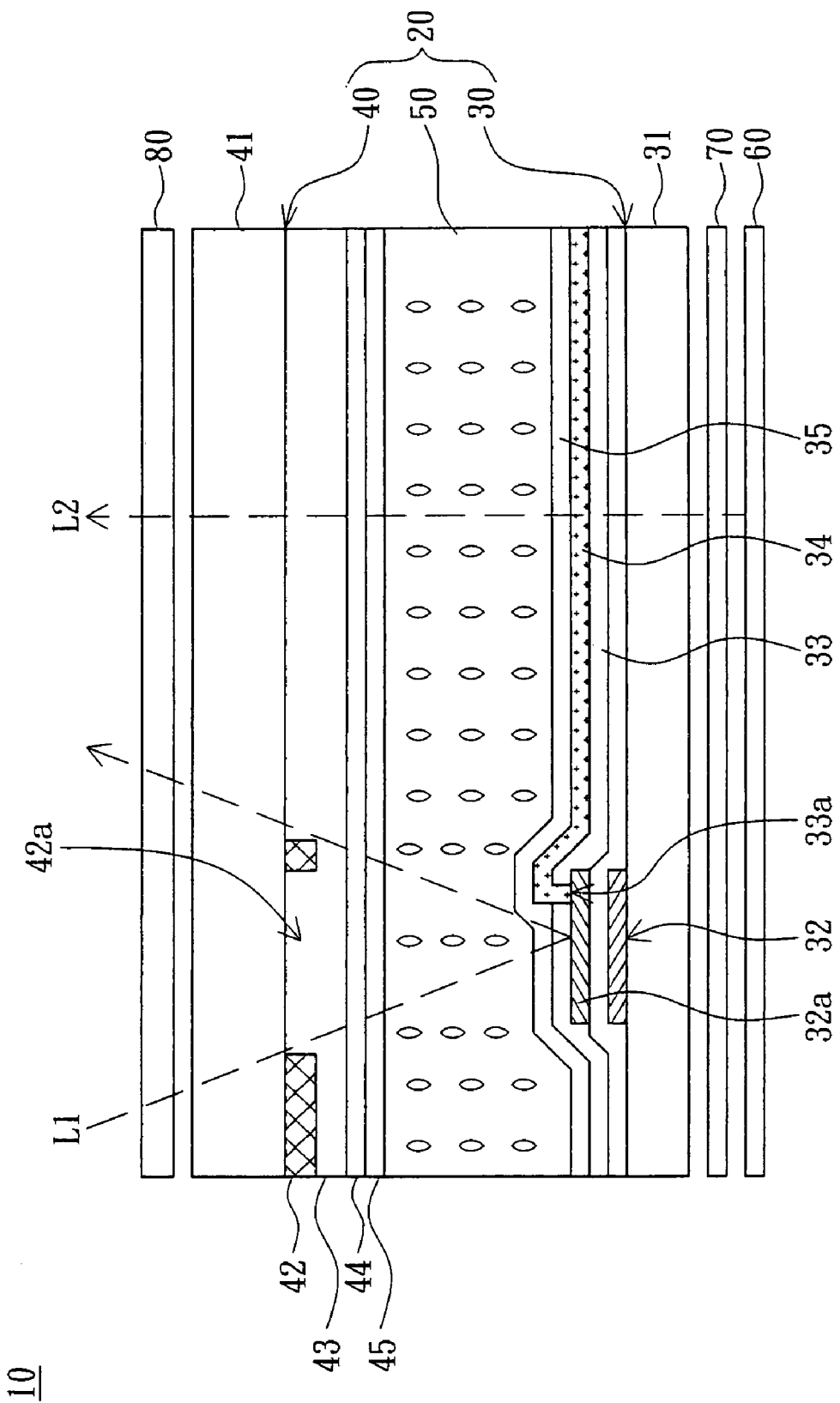
FIG. 1A is a structural cross-sectional view of a first type of liquid crystal display device according to a preferred embodiment of the invention.

Referring to FIG. 1A, a structural cross-sectional view of a first type of liquid crystal display device according to a preferred embodiment of the invention is shown. As shown in FIG. 1A, the liquid crystal display device 10 is includes a liquid crystal display panel 20, a backlight module 60, a first polarizer 70 and a second polarizer 80. The liquid crystal display panel 20 includes a first substrate 30, a second substrate 40 and a liquid crystal layer 50. The first substrate 30 includes a first base 31, a storage capacitor 32, a dielectric layer 33 and a transparent electrode 34. The storage capacitor 32 is disposed on the first base 31 and has a reflective electrode 32a. The dielectric layer 33 is disposed over the first base 31 and covers at least part of the storage capacitor 32. The dielectric layer 33 has a contact hole 33a. The transparent electrode 34 is disposed on at least part of the dielectric layer 33. One end of the transparent electrode 34 is electrically connected to the reflective electrode 32a via the contact hole 33a. The second substrate 40 is substantially parallel to the first substrate 30 and includes a second base 41, a black matrix 42 and a common electrode 44. The black matrix 42 is disposed on the second base 41 and corresponds to the storage capacitor 32. The black matrix 42 has an opening 42a. The black matrix 42 may comprise other opaque layers. The opening 42a corresponds to the reflective electrode 32a and the end of the transparent electrode 34 electrically connected to the reflective electrode 32a. The opening 42a disposed above the storage capacitor 32 is provided to let outside light L1 enter the liquid crystal display panel 20 such that the reflective electrode 32a reflects the outside light to provide a light source to the liquid crystal display panel 20. The common electrode 44 is disposed on the second base 41 and covers the black matrix 42 and the opening 42a. The liquid crystal layer 50 is disposed between the first substrate 30 and the second substrate 40. The backlight module 60 is disposed underneath the liquid crystal display panel 20 and adjacent to the first substrate 31 to provide inside light L2 to the liquid crystal display panel 20. The first polarizer 70 is disposed between the backlight module 60 and the liquid crystal display panel 20. The second polarizer 80 is disposed on the liquid crystal display panel 20 and adjacent to the second substrate 40. The contact hole 33a is disposed within the projection area of the opening 42a, or, part of the contact hole 33a is disposed within the projection area of the opening 42a.

Besides, the liquid crystal display panel 20 further includes a first vertical alignment film 35 and a second vertical alignment film 45. The first vertical alignment film 35 is disposed on dielectric layer 33 and covers the transparent electrode 34 and the storage capacitor 32. The second vertical alignment film 45 is disposed on the common electrode 44. The liquid crystal layer 50 is disposed between the first vertical alignment film 35 and the second vertical alignment film 45.

In the present embodiment of the invention, the second substrate 41 further includes a color filter 43. The color filter 43 is disposed between the second base 41 and the common electrode 44, and covers the black matrix 42 and the opening 42a.

Figure 1B:
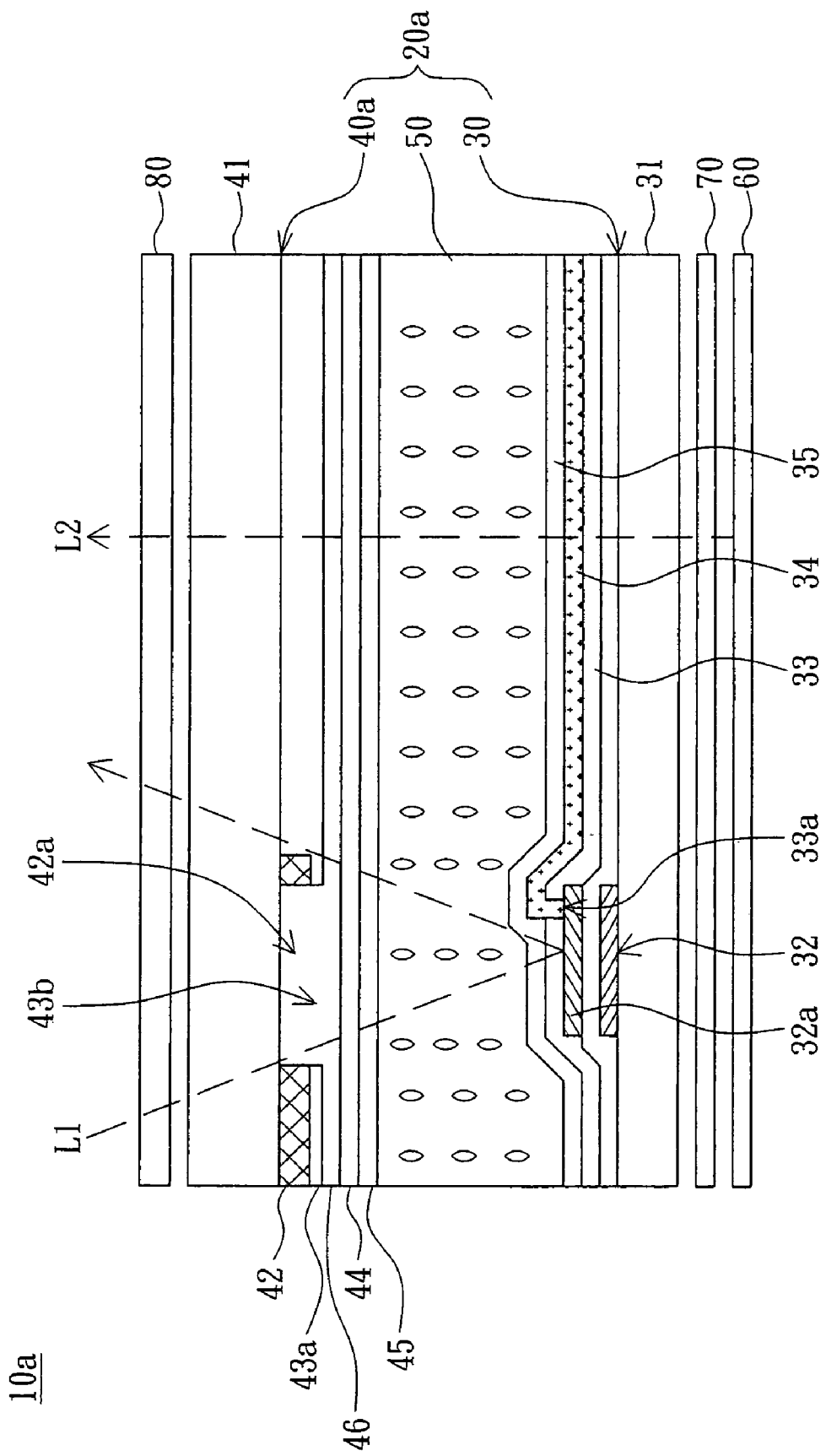
FIG. 1B is a structural cross-sectional view of a second type of liquid crystal display device according to a preferred embodiment of the invention.

However, the color filter of the liquid crystal display panel can be designed to have an opening. Referring to FIG. 1B, a structural cross-sectional view of a second type of liquid crystal display device 10a according to a preferred embodiment of the invention is shown. As shown in the liquid crystal display device 10a, the second substrate 40a of the liquid crystal display panel 20a further includes a color filter 43a and a flat layer 46. The color filter 43a is disposed between the second base 41 and the common electrode 44, and covers the black matrix 42. The color filter 43a has another opening 43b corresponding to the opening 42a of the black matrix 42. The flat layer 46 is disposed between the color filter 43a and the common electrode 44, and covers the opening 42a of the black matrix 42 and the opening 43b of the color filter 43a.

Figure 1C:
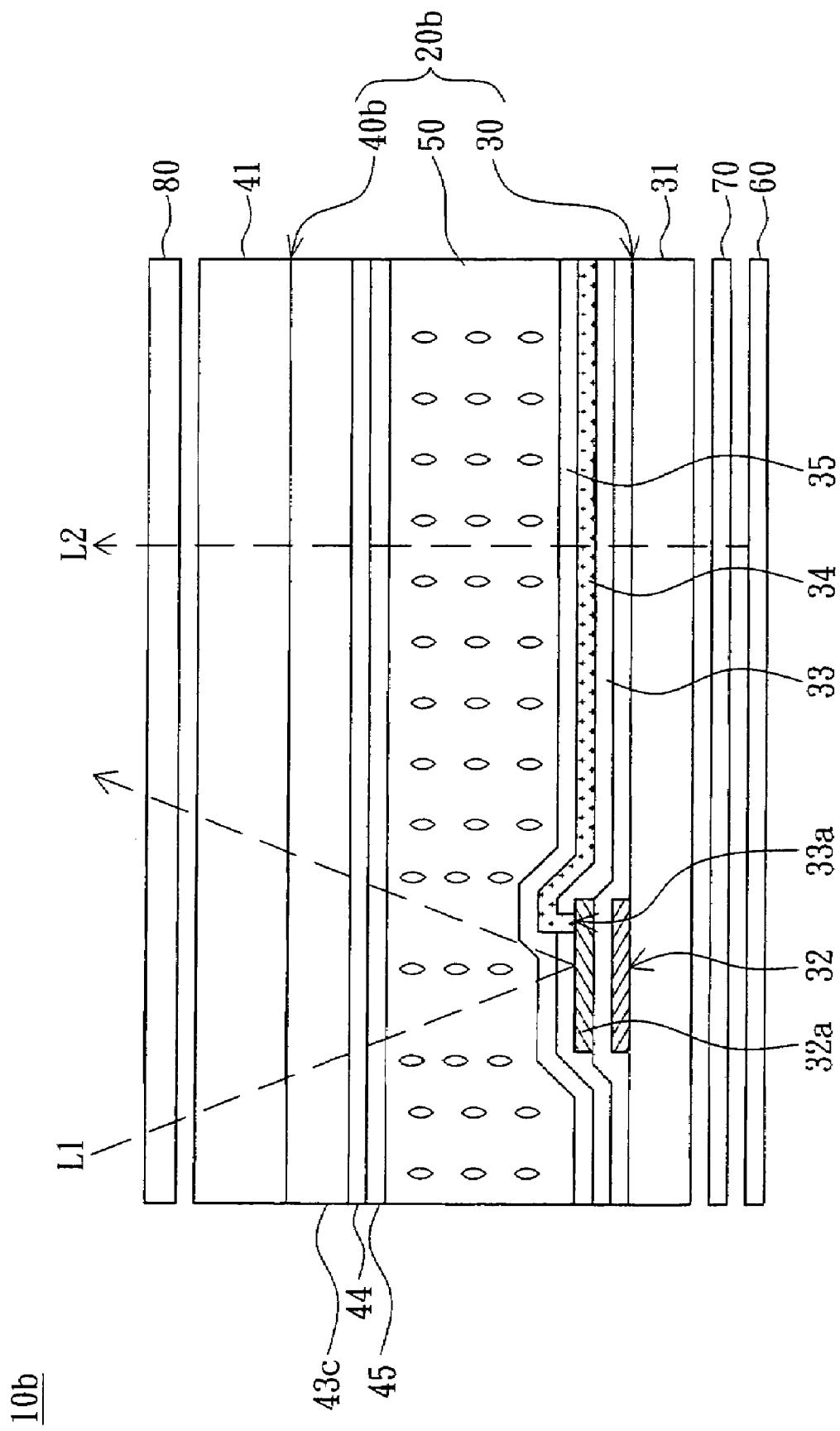
FIG. 1C is a structural cross-sectional view of a third type of liquid crystal display device according to a preferred embodiment of the invention.

Furthermore, the storage capacitor of the liquid crystal display panel does not require the opening of the black matrix. Referring to FIG. 1C, a structural cross-sectional view of a third type of liquid crystal display device 10b according to a preferred embodiment of the invention is shown. As shown in the liquid crystal display device 10b, the second substrate 40b of the liquid crystal display panel 20b further includes a color filter 43c disposed on the second base 41. The common electrode 44 is disposed on the color filter 43c.

Figure 1D:
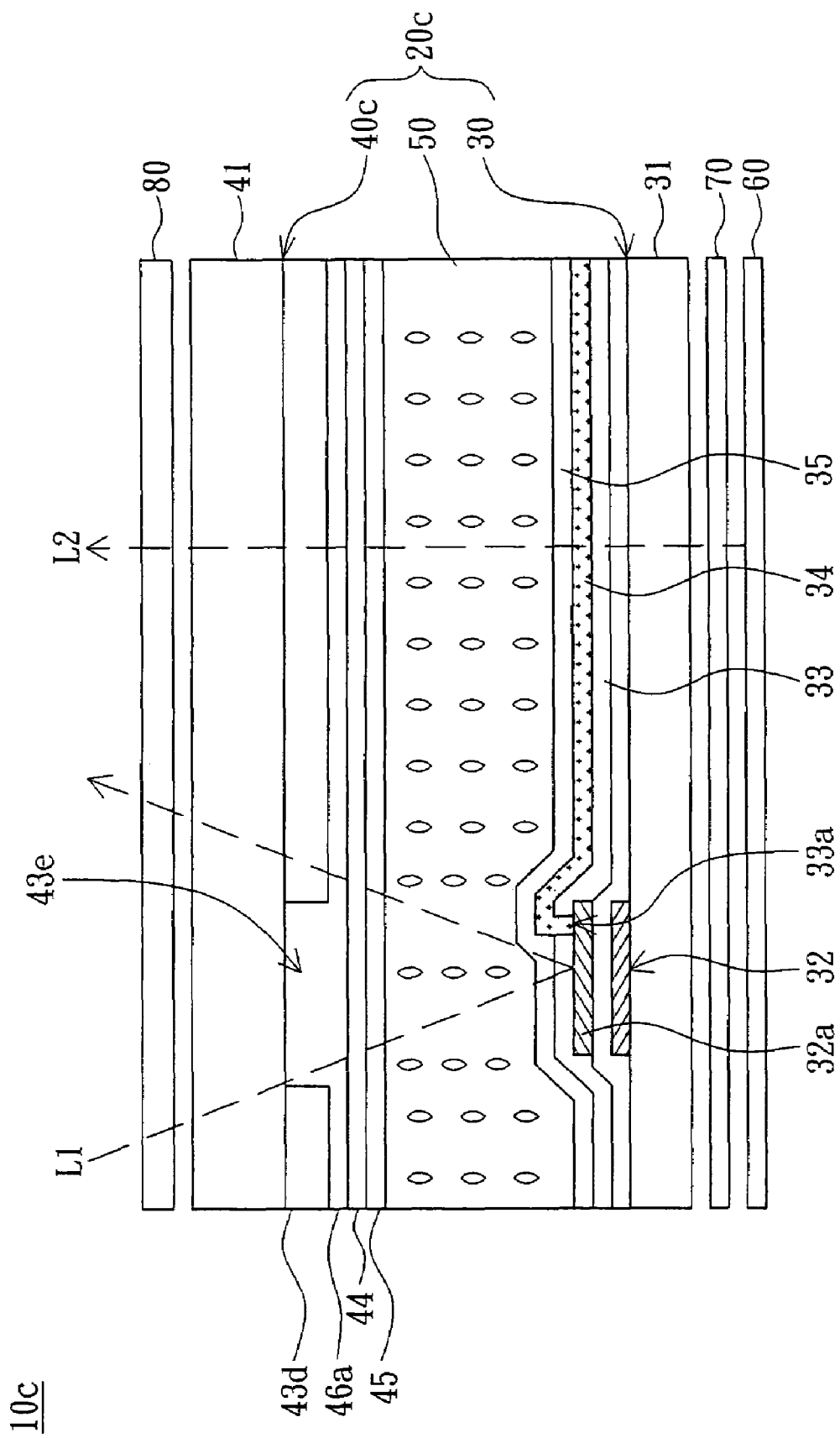
FIG. 1D is a structural cross-sectional view of a fourth type of liquid crystal display device according to a preferred embodiment of the invention.

The storage capacitor of the liquid crystal display panel does not require the opening of the black matrix. The color filter can be designed to have an opening. Referring to FIG. 1D, a structural cross-sectional view of a fourth type of liquid crystal display device 10c according to a preferred embodiment of the invention is shown. As shown in the liquid crystal display device 10c, the second substrate 40c of the liquid crystal display panel 20c further includes a color filter 43d and a flat layer 46a. The color filter 43d has an opening 43e corresponding to the reflective electrode 32a and the end of the transparent electrode 34 electrically connected to the reflective electrode 32a. The flat layer 46a is disposed between the color filter 43d and the common electrode 44, and covers the opening 43e.

Moreover, the liquid crystal display panels 20~20c can respectively be a vertical alignment (VA) type of liquid crystal display panel or a micro-reflection type display panel. Each liquid crystal layer 20~20c includes a number of vertically aligned liquid crystal molecules. Moreover, the liquid crystal display panels 20~20c form a reflection area corresponding to the storage capacitor 32, respectively. The liquid crystal display panels 20~20c form a transmissive area corresponding to the transparent electrode 34, respectively. When a voltage is applied to the transparent electrode 34, the dielectric layer 33 is provided to divide the voltage in the reflection area of the liquid crystal layer such that the voltage and reflectance (V-R) relationship curve of the liquid crystal display panels 20~20c on the reflective electrode 32a is substantially matched to the voltage and transmittance (V-T) relationship curve on the transparent electrode 34 of the liquid crystal display panels 20~20c. That is, through the design of the dielectric layer 33, the voltage and reflectance (V-R) relationship curve in the reflection area of the liquid crystal display panels 20~20c will be substantially matched to the voltage and transmittance (V-T) relationship curve in the transmissive area of the liquid crystal display panels 20~20c, largely increasing the contrast of the liquid crystal display devices 10~10c.

Figure 2:
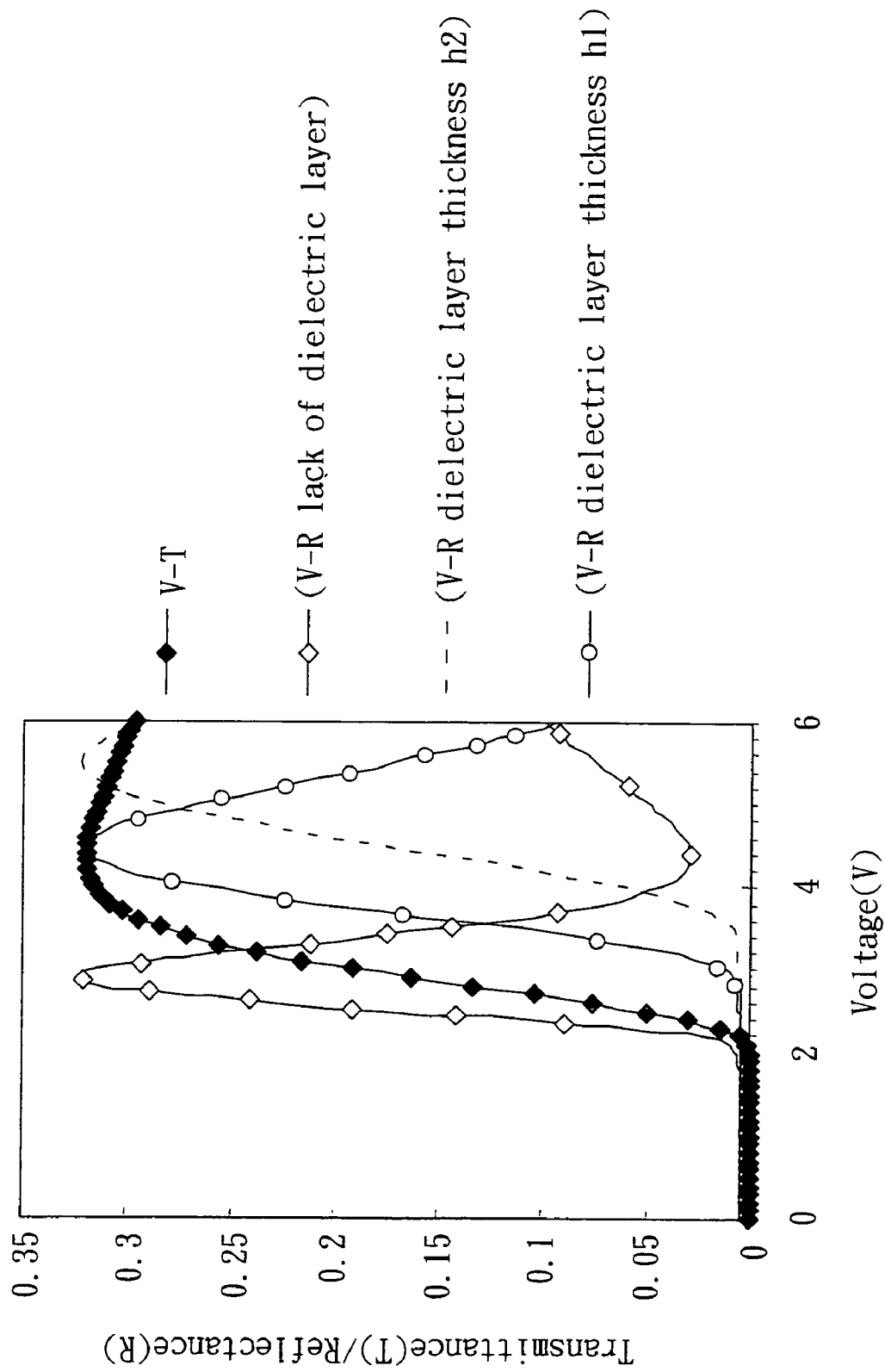
FIG. 2 illustrates voltage and reflectance (V-R) relationship curves in a reflection area of a liquid crystal display panel and a voltage and transmittance (V-T) relationship curve in a transmissive area of a liquid crystal display panel when the transparent electrode is not within the reflection area according to a preferred embodiment of the invention.

Referring to FIG. 2, voltage and reflectance (V-R) relationship curves in a reflection area of a liquid crystal display panel and a voltage and transmittance (V-T) relationship curve in a transmissive area of a liquid crystal display panel when the transparent electrode is not within the reflection area according to a preferred embodiment of the invention are shown. As shown in FIG. 2, when the thickness of the dielectric layer 33 is different, for example, when the thickness h2 is larger than the thickness h1, the matching between the voltage and reflectance (V-R) relationship curve and the voltage and transmittance (V-T) relationship curve will be different accordingly. However, when the thickness of the dielectric layer 33 is too thick or too thin, the voltage and reflectance (V-R) relationship curve will not match with the voltage and transmittance (V-T) relationship curve. When the dielectric layer has a thickness ranging from about 0.6 μm to about 5 μm, the voltage and reflectance (V-R) relationship curve matches well with the voltage and transmittance (V-T) relationship curve.

Figure 3:
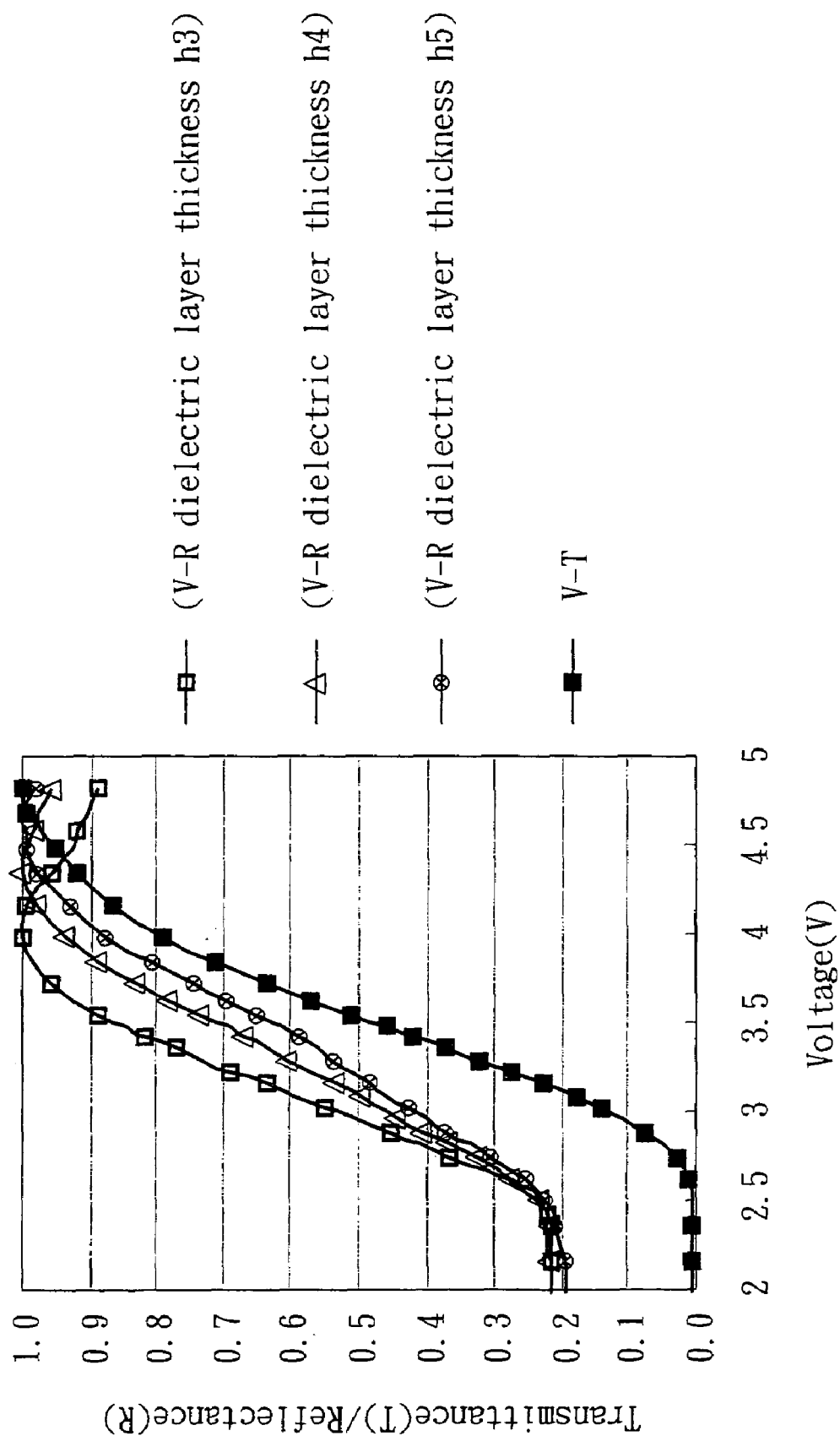
FIG. 3 illustrates voltage and reflectance (V-R) relationship curves in a reflection area of a liquid crystal display panel and a voltage and transmittance (V-T) relationship curve in a transmissive area of a liquid crystal display panel when a small part of the transparent electrode 34 is within the reflection area according to a preferred embodiment of the invention.

Referring to FIG. 3, voltage and reflectance (V-R) relationship curves in a reflection area of a liquid crystal display panel and a voltage and transmittance (V-T) relationship curve in a transmissive area of a liquid crystal display panel when a small part of the transparent electrode is within the reflection area according to a preferred embodiment of the invention are shown. As shown in FIG. 3, since a small part of the transparent electrode 34 is within the reflection area, and part of the voltage on the reflection of the liquid crystal layer is provided by the voltage of the transparent electrode 34, the rising part in the front segment of the voltage and reflectance (V-R) relationship curve in the reflection area will be better matched to the rising part in the front segment of the voltage and transmittance (V-T) relationship curve in the transmission area. When the thickness of the dielectric layer 33 is different, for example, when the thickness h5 is larger than the thickness h4 and the thickness h4 is larger than the thickness h3, the matching between the voltage and reflectance (V-R) relationship curve and the voltage and transmittance (V-T) relationship curve will be different accordingly.

Any one who is skilled in the technology of the present embodiment of the invention will understand that the technology of the present embodiment of the invention is not limited thereto. For example, examples of the dielectric layer 33 include inorganic materials or organic materials. Besides, the reflective electrode 32a includes a reflective metal, a reflective metallic alloy or any combination thereof. The reflective electrode 32a can be a single layered or a multiple layered structure in the sequential order of titanium/aluminum or titanium/aluminum/titanium/aluminum from the bottom layer to the top layer. Moreover, examples of the first base 31 and the second base 41 include a glass substrate, an insulated substrate, a plastic substrate, a ceramic substrate or a flexible substrate. The transparent electrode 34 is a pixel electrode inside a pixel of an active matrix pixel array, and the material of the transparent electrode includes a transparent conductive material including indium tin oxide (ITO), indium zinc oxide (IZO), cadmium tin oxide (CTO), stannum dioxide ($SnO_2$), zinc oxide (ZnO) or other similar transparent metallic oxides. The liquid crystal display device 10 can be applied to any electronic devices requiring a display unit. Examples of the electronic device include computer screen, flat TV, monitor screen, mobile phone, handheld game device, digital camera (DC), digital video (DV), digital audio device, personal digital assistant (PDA), notebook and table PC.

According to the liquid crystal display panel and the liquid crystal display device disclosed in the above embodiment of the invention, the liquid crystal display panel uses an electrode of a storage capacitor as a reflection area and has an opening on an opaque layer (such as a black matrix) corresponding to the reflection area, such that the light reflected inwardly, that is, the light L1, is modulated. Besides, the liquid crystal display panel according to the present embodiment of the invention has a dielectric layer on the topmost of the storage capacitor for dividing the voltage of the liquid crystal layer in the reflection area to achieve the same saturation voltage as that in the transmissive area. Since a small part of the reflection area has both the transparent electrode and the reflective electrode, the threshold voltage of the reflection area will be close to the threshold voltage of the transmissive area, hence achieving higher reflection contrast.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display panel, comprising:
   a first substrate, comprising:
      a first base;
      a storage capacitor disposed on the first base and having a reflective electrode; and
      a dielectric layer disposed over the first base and covering at least part of the storage capacitor;
   a second substrate substantially parallel to the first substrate, comprising:
      a second base;
      an opaque layer disposed on the second base and corresponding to the storage capacitor, wherein the opaque layer has a first opening corresponding to the reflective electrode, the first opening being located over the storage capacitor;
      a common electrode disposed on the second base and covering the opaque layer and the first opening;
      a color filter disposed between the second base and the common electrode and covering the opaque layer, wherein the color filter has a second opening corresponding to the first opening, the second opening being located over the storage capacitor; and
      a flat layer disposed between the color filter and the common electrode, and covering the first opening and the second opening; and
   a liquid crystal layer disposed between the first substrate and the second substrate.

2. The liquid crystal display panel according to claim 1, wherein the dielectric layer has a contact hole, the first substrate further comprises a transparent electrode disposed on at least part of the dielectric layer, and one end of the transparent electrode is electrically connected to the reflective electrode via the contact hole.

3. The liquid crystal display panel according to claim 2, further comprising:
   a first vertical alignment film disposed on the dielectric layer and covering the transparent electrode; and
   a second vertical alignment film disposed on the common electrode;
   wherein the liquid crystal layer is disposed between the first vertical alignment film and the second vertical alignment film.

4. The liquid crystal display panel according to claim 2, wherein the dielectric layer divides the voltage in a reflection area of the liquid crystal layer such that the voltage and reflectance (V-R) relationship curve on the reflective electrode is substantially matched to the voltage and transmittance (V-T) relationship curve on the transparent electrode when a voltage is applied to the transparent electrode.

5. The liquid crystal display panel according to claim 1, wherein the first opening passes through the opaque layer and the second opening passes through the color filter.

6. The liquid crystal display panel according to claim 1, wherein the liquid crystal layer includes vertically aligned liquid crystal molecules.

7. The liquid crystal display panel according to claim 1, wherein the dielectric layer has a thickness ranging from about 0.6 μm to about 5 μm.

8. The liquid crystal display panel according to claim 1, wherein the opaque layer is a black matrix.

9. The liquid crystal display panel according to claim 1, wherein the reflective electrode comprises a reflective metal, a reflective metallic alloy or a combination thereof.

10. The liquid crystal display panel according to claim 1, wherein the reflective electrode comprises titanium/aluminum or titanium/aluminum/titanium/aluminum.

11. A liquid crystal display device, comprising:
a liquid crystal display panel, comprising:
a first substrate including:
a first base;
a storage capacitor disposed on the first base and having a reflective electrode;
a dielectric layer disposed over the first base and covering at least part of the storage capacitor, wherein the dielectric layer has a contact hole; and
a transparent electrode disposed on at least part of the dielectric layer, wherein one end of the transparent electrode is electrically connected to the reflective electrode via the contact hole;
a second substrate substantially parallel to the first substrate and including:
a second base;
a black matrix disposed on the second base and corresponding to the storage capacitor, wherein the black matrix has a first opening corresponding to the reflective electrode, whereby outside light enters the liquid crystal display panel such that the reflective electrode reflects the outside light to provide a light source to the liquid crystal display panel, the first opening being located over the storage capacitor;
a common electrode disposed on the second base and covering the black matrix and the first opening;
a color filter disposed between the second base and the common electrode and covering the black matrix, wherein the color filter has a second opening corresponding to the first opening, the second opening being located over the storage capacitor; and
a flat layer disposed between the color filter and the common electrode and covering the first opening and the second opening; and
a liquid crystal layer disposed between the first substrate and the second substrate;
a backlight module disposed underneath the liquid crystal display panel;
a first polarizer disposed between the backlight module and the liquid crystal display panel; and
a second polarizer disposed on the liquid crystal display panel.

12. The liquid crystal display device according to claim 11, wherein the first opening passes through the opaque layer and the second opening passes through the color filter.

13. The liquid crystal display device according to claim 11, further comprising:
a first vertical alignment film disposed on the dielectric layer and covering the transparent electrode; and
a second vertical alignment film disposed on the common electrode;
wherein the liquid crystal layer is disposed between the first vertical alignment film and the second vertical alignment film.

14. The liquid crystal display device according to claim 11, wherein the dielectric layer has a thickness ranging from about 0.6 μm to about 5 μm.

15. The liquid crystal display device according to claim 11, wherein the dielectric layer divides the voltage in a reflection area of the liquid crystal layer such that the voltage and reflectance (V-R) relationship curve on the reflective electrode is substantially matched to the voltage and transmittance (V-T) relationship curve on the transparent electrode when a voltage is applied to the transparent electrode.

16. The liquid crystal display device according to claim 11, wherein the reflective electrode comprises a reflective metal, a reflective metallic alloy or a combination thereof.

17. The liquid crystal display device according to claim 11, wherein the reflective electrode comprises titanium/aluminum or titanium/aluminum/titanium/aluminum.

18. The liquid crystal display device according to claim 11, wherein the liquid crystal display panel is a vertical alignment (VA) type of liquid crystal display panel.

* * * * *